United States Patent
Davis

[15] 3,635,341
[45] Jan. 18, 1972

[54] PROCESS OF PRECOATING AND FILTERING USING A ROTARY DRUM VACUUM FILTER

[72] Inventor: Steven S. Davis, 550 South First East, Bountiful, Utah 84010
[22] Filed: July 22, 1969
[21] Appl. No.: 843,502

[52] U.S. Cl. ............................................ 210/75, 210/396
[51] Int. Cl. ................................................... B01d 37/02
[58] Field of Search .................. 210/75, 193, 396, 402, 404

[56] References Cited

UNITED STATES PATENTS

| | | | |
|---|---|---|---|
| 1,796,491 | 3/1931 | Sweetland | 210/402 X |
| 2,081,398 | 5/1937 | Giles | 210/402 X |
| 2,576,275 | 11/1951 | Bench | 210/193 X |
| 2,576,288 | 11/1951 | Fink et al. | 210/75 |
| 3,263,816 | 8/1966 | Krynski | 210/402 X |

Primary Examiner—Samih N. Zaharna
Attorney—Robert R. Finch and Richard E. Bojanowski

[57] ABSTRACT

A rotary drum vacuum precoat filter equipped so that the liquid level therein may be controllably varied to completely submerge the drum for precoating, followed by exposure of only a small part of the drum (not more than 30 percent) for cake drying and removal during filtration. There is also disclosed a scraper assembly for cake removal from the exposed drum just prior to resubmergence.

4 Claims, 5 Drawing Figures

PATENTED JAN 18 1972

INVENTOR.
STEVEN S. DAVIS
BY Robert R. Finch
P. F. Bojanowski
ATTORNEY

PATENTED JAN 18 1972

INVENTOR.
STEVEN S. DAVIS
BY Robert R. Finch
R. F. Bojanowski
ATTORNEY

PROCESS OF PRECOATING AND FILTERING USING A ROTARY DRUM VACUUM FILTER

BACKGROUND OF THE INVENTION

The invention relates generally to pressure differential filtration and in particular to ways for carrying out high-capacity precoat operations on rotary drum vacuum filters.

It is known that precoating of a filter surface is accomplished most efficiently when the filter surface is fully submerged because the full capacity of the vacuum pump is utilized for cake formation and the cake thus formed is usually more uniform.

It is also well known that filtration rates are maximized when the entire filter surface is submerged. However, this suffers from the disadvantage that the cake must be removed while submerged; hence, the solids are recovered as a mud or slurry, rather than a relatively dry cake, as is many times desired.

OBJECTS OF THE INVENTION

It is a primary object of the invention to provide improved ways for conducting precoat filtration under conditions wherein precoating is effected under complete submergence to achieve maximum utilization of available vacuum capacity and in which filtration is conducted under specific conditions approaching complete submergence to provide maximum form time and consequent high-capacity operation while enabling substantially complete displacement of amounts of the free water to yield as product as relatively dry filter cake.

SUMMARY OF THE INVENTION

The foregoing and possibly other objects of the invention are attained by completely submerging a filter surface in a tank of precoat slurry, applying a pressure drop across the filter surface to cause a cake of precoat material of predetermined thickness to be formed thereon, reducing the liquid level in the tank to a constant elevation so that a minor portion of the coated filter surface is exposed to the atmosphere while maintaining a pressure drop across the entire filter surface, replacing the precoat slurry with an insoluble-bearing liquid and thereby effecting deposition of a layer of insolubles on said coated filter surface, continuously rotating the filter surface whereby successive portions of said cake are sequentially exposed to the atmosphere for a period of time, and continuously removing the insolubles and a small portion of the precoat cake during such exposure just prior to its resubmergence.

An insoluble-bearing liquid is a liquid vehicle, e.g., water containing insoluble solids such as organic or inorganic particulates and/or immiscible liquids such as hydrocarbons and the like.

The apparatus to carry out the process of this invention comprises a tank; a filter drum mounted for rotation in the tank, the outer surface of the rum carrying a filter medium and a drainage deck; means for applying a relatively reduced pressure to the underside of said filter medium; inlet means for introducing a precoat slurry and/or liquid bearing materials into said tank; level control means for maintaining the upper level of liquid in said tank at selected elevations varying between that elevation at which about 70–90 percent of said filter surface is submerged and that at which said filter surface is submerged and that at which said filter surface is totally submerged; a scraper or cutting blade for engaging the surface of a cake formed on said surface; means for advancing the blade toward said cake to compensate for changes in the cake thickness; and means associated with said blade for carrying away cake removed thereby.

In a particular modification this apparatus, a scraper blade-discharge mechanism is provided for removing filter cake whereby the blade is located close to and in closely overlying relationship to the upper liquid level in the tank, with the edge of the blade in contact with the descending side of the exposed cake. There is also provided a mechanism for advancing the blade in a plane substantially horizontal to the upper level of liquid in the tank to compensate for the gradual reduction in precoat cake thickness, arising from the continuous removal of such cake.

In order that the invention may be more readily understood and carried into effect, reference is made to the accompanying drawings and the following description thereof, which are presented by way of illustration only and are not to be taken as limiting the invention, the scope of which is defined by the appended claims rather than by any preceding description.

Figure 1:
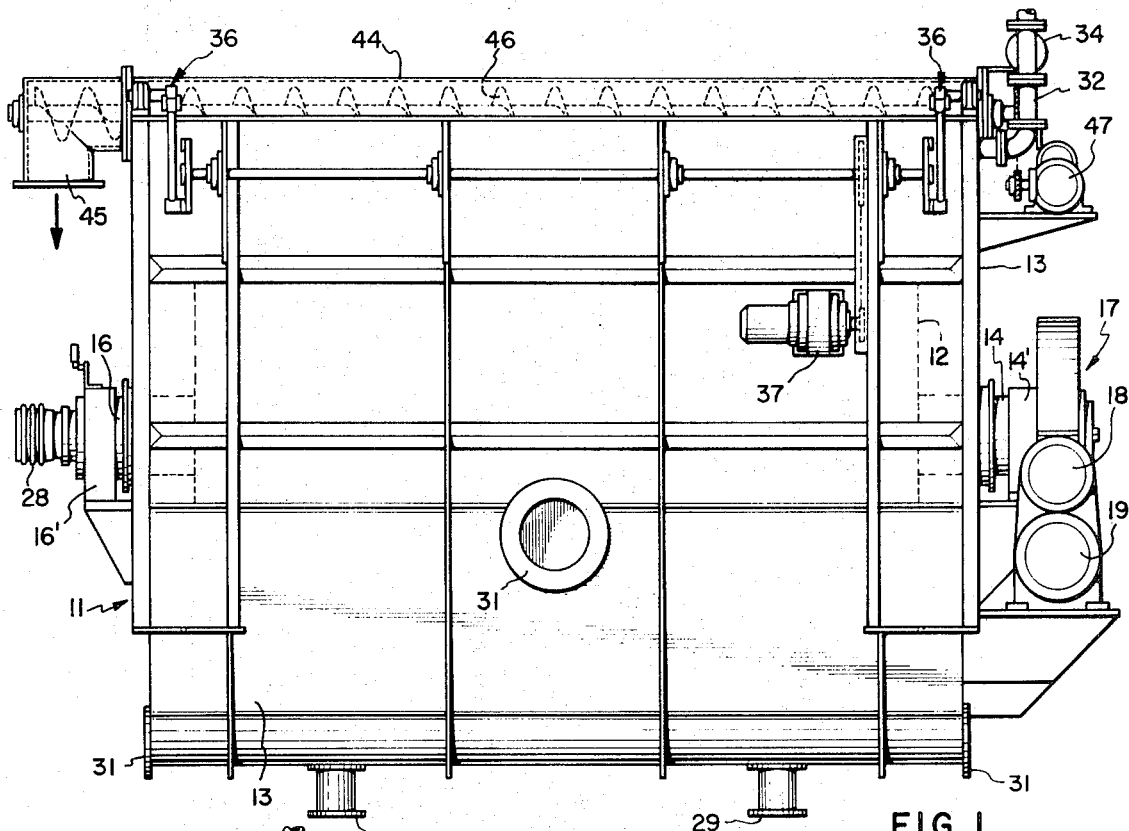
FIG. 1 is a front elevational view of a rotary drum vacuum filter embodying the invention.

In the drawings, the invention is illustrated as embodied in a rotary drum filter generally designated 11 which comprises a drum 12 mounted for rotation in a tank 13 by means of trunnions 14 and 16 journaled in bearings 14' and 16' respectively.

Rotation of the drum is effected by means of a drive, generally designated 17, which includes a motor 18, a gear reducer 19, worm 21 and enclosed worm gear 22. The outer surface 23 of the drum is divided into sectors by dividers 24 between which are carried cloth-covered drainage grids not specifically shown but which are generally designated 26. Vacuum pipes 27 separately connect each section to the hollow interior of the left-hand trunnion 16 which, in turn, connects through a coupling 28 to a suitable vacuum source, all in accordance with known practice.

The tank is equipped with usual lower cleanout ports 29 and covered inspection ports 31.

Precoat material and/or feed material to be filtered is introduced via a conduit 32 which can selectively receive material either from a first valved branch conduit 33 or a second valved branch conduit 34. One of the branch conduits may be used for introduction of precoat material and the other for feed.

The tank contents are stirred by a conventional agitator assembly 36 driven by a motor 37 through a crank wheel 38.

The level of material in the tank is regulated by means of a lower valved outlet 39 and an upper nonvalved overflow outlet 40. When the valved outlet 39 is closed, the upper outlet maintains the maximum level in the tank at an elevation sufficient to completely submerge a precoated drum. When outlet 39 is open, the liquid level will drop sufficiently to expose a predetermined percentage of the drum which, in accordance with the invention, should not exceed 30 percent of the total filter surface, thus leaving at least 70 percent of the filter surface submerged.

A cake scraper blade assembly, generally designated 42, is provided to scraper the exposed surface of the filter cake just prior to its resubmergence. In the embodiment illustrated in FIG. 2, the assembly comprises a tapered chute 43 which communicates with a closed tubular housing 44 having an outlet 45 (see FIG. 1) and in which there is rotatably mounted a high-speed screw 46 driven by a drive assembly 47.

High-speed rotation of the screw results in a pumping action in the tube which assists in cake discharge and removal. The scraper assembly is mounted so that at the start of the filtration cycle, when the precoat is at its maximum depth, the chute itself tilts slightly upwardly. When the filter cycle is completed and the precoat cake is almost completely removed, the cake discharge chute is approximately horizontal. As shown by the dotted lines in FIG. 2, the scraper blade may be tilted completely out of the way while the precoat cake is being formed.

Figure 2:
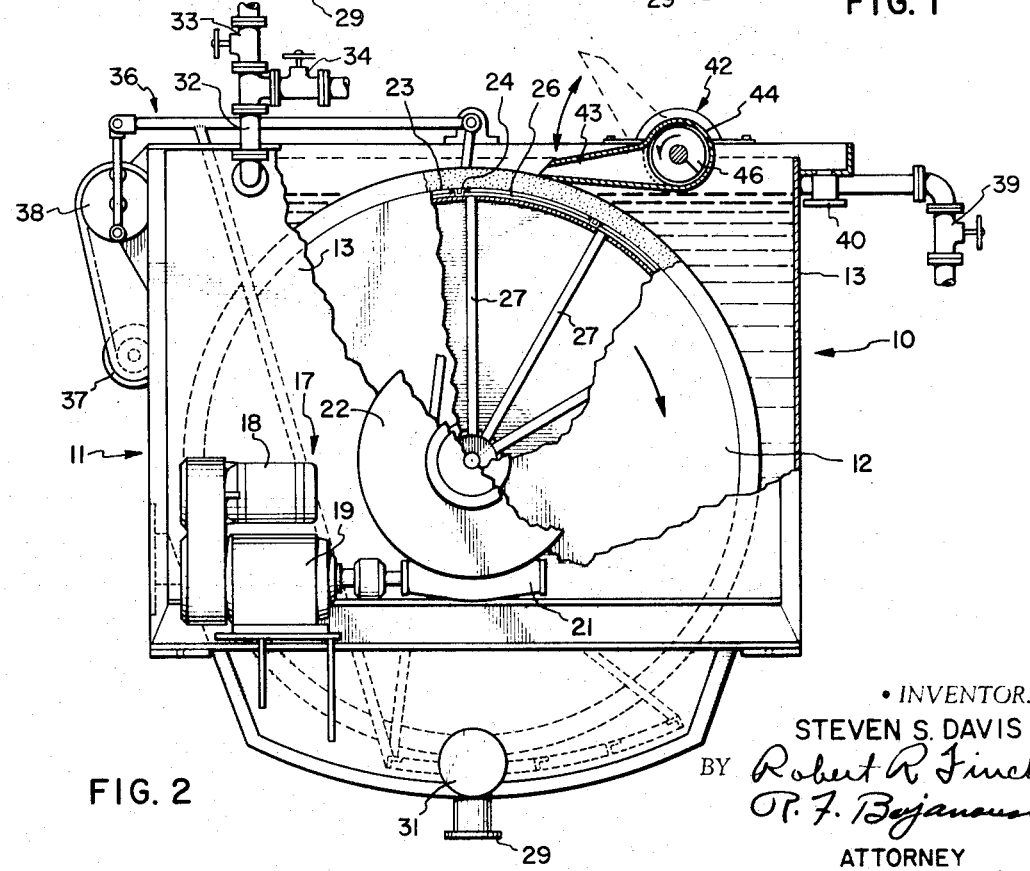
FIG. 2 is an end elevational view of the filter of FIG. 1, portions being broken away to show details of construction.
Figure 3:
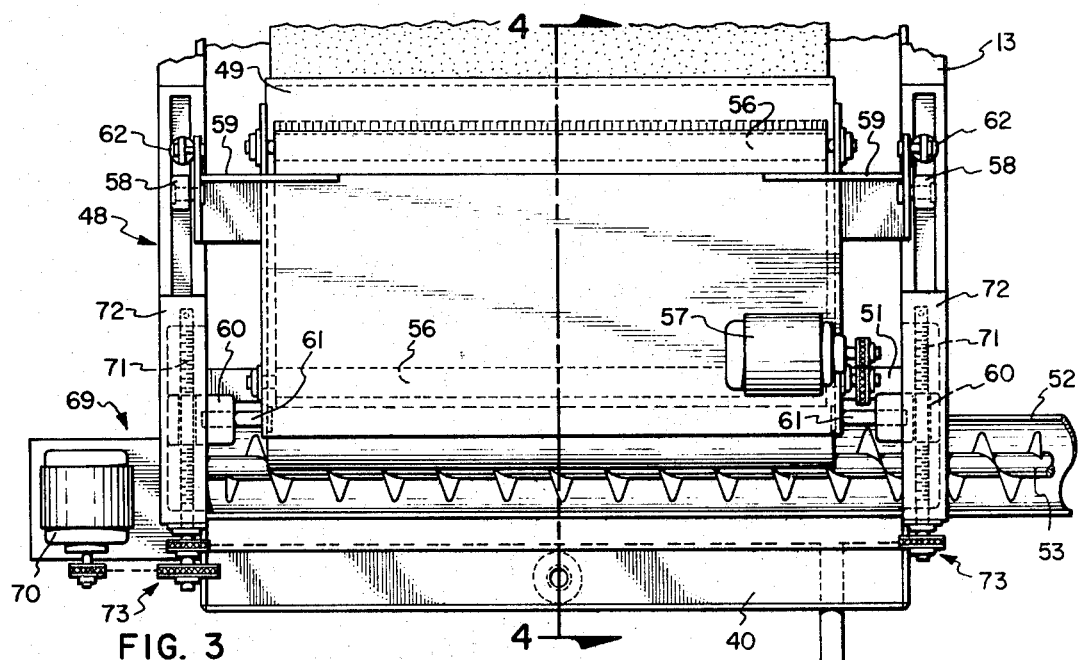
FIG. 3 is a partial top view of a filter embodying a modified cake discharge mechanism.
Figure 4:
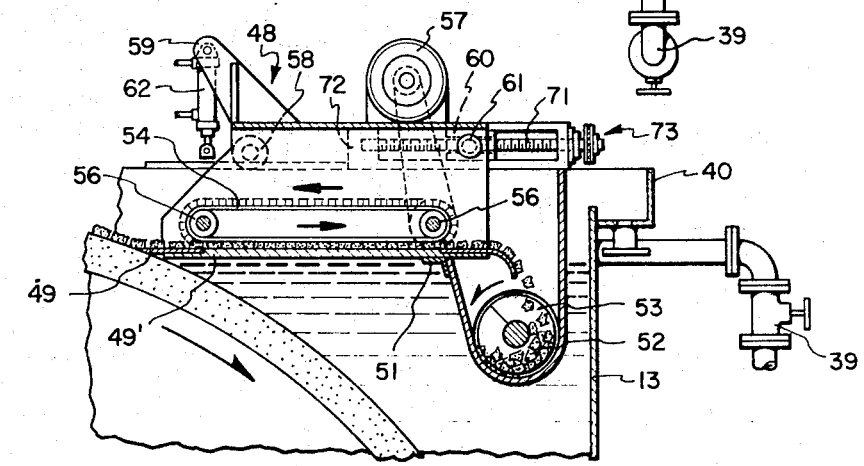
FIG. 4 is a view taken in a plane along line 4—4 of FIG. 3.
Figure 5:
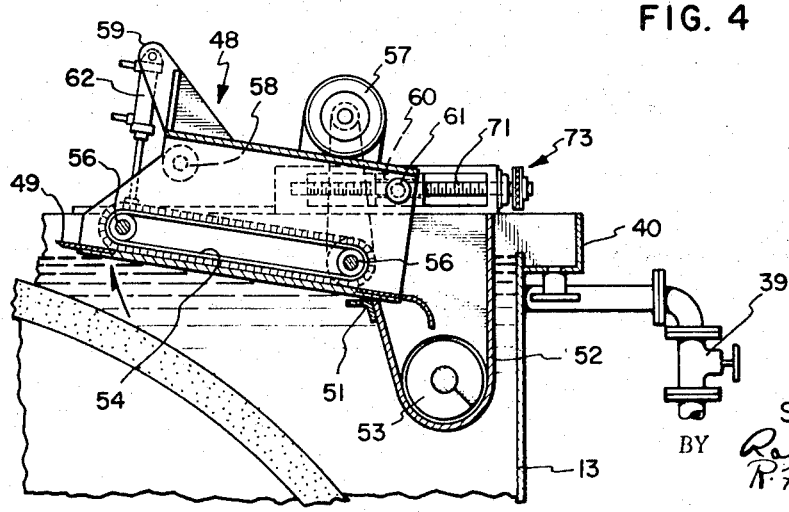
FIG. 5 is a view similar to FIG. 4 but with the scraping mechanism swung upward to accommodate total submergence.

A modified scraper blade and cake discharge assembly is illustrated in FIGS. 3–5. This assembly, which may be substituted for the discharge assembly illustrated in FIGS. 1 and 2, is not the equivalent thereof, but is a modification, useful under different conditions.

The scraper assembly illustrated in FIGS. 3–5, generally designated 48, is arranged so that the blade is fixed in a substantially horizontal plane during the entire cake removal operation. The discharge assembly includes a blade 49, which is held in a horizontal position within the upper portion of the tank 13 so that the scraping edge of the scraper will remove a portion of the exposed filter cake at a point just before the drum is resubmerged.

The discharge assembly includes, in addition to blade 49, a platform 49' connected to and extending rearwardly from the blade into sliding engagement with a seal strip 51 located at the top of the leading edge of a watertight trough 52. The trough is mounted within and extends the full length of the tank 13. The platform terminates at a point just above the trough 52. A screw conveyor 53, which may be driven by any suitable means, is located in the bottom of the trough for carrying away cake deposited therein.

Spaced above the platform 49' is an endless belt 54 trained about spaced-apart rolls 56, one of which is driven by a motor 57 through a conventional chain drive. The belt assists in moving the cake along the platform to discharge into the trough.

Mounted above and along the top edge of the tank is a pair of housings 72, each of which encloses a threaded shaft 71 which is rotatably driven by a motor 70 through a chain and sprocket assembly 73. Each of the threaded shafts passes through a threaded bore of a block 60, thus enabling movement of the block along the shaft upon rotation of the shaft.

The rear section of the blade 49 is pivotally joined to the block 60 by a pin 61. The front section of the blade is supported on wheels 58 which rest on the tank wall.

Hydraulic rams 62 are interconnected between the tank and the brackets 59 on the scraper assembly. When the rams are extended, the front section of the blade is elevated above the maximum liquid level.

When the blade is in the lower or operating position, rotation of the threaded shafts moves the blocks 60 towards the filter cake at a predetermined rate, thereby ensuring uniform scraping action close to the liquid surface. The motor may be reversed to return the blade to its original starting position.

During advance of the blade, the ram 62 is freed from pressure so that it can float and thus not interfere with operation.

In the discharge mechanism illustrated in FIGS. 3–5, it is possible to effect cake removal just prior to resubmergence and thus provide maximum dry time with minimum cake exposure. Also, the exposed area of the cake after scraping is minimized, as the cake is immediately resubmerged, thus minimizing vacuum loss.

I claim:

1. A continuous method for separation of insolubles from liquid comprising submerging the entire filter surface of a rotary drum filter in a slurry of precoat material in a tank, rotating said drum while applying a relatively reduced pressure to the underside of said filter surface during submergence to draw filtrate therethrough and to form a precoat cake thereon, adding additional precoat slurry to the tank until a cake of predetermined thickness is formed on said filter surface, reducing the level of the liquid in the tank to an elevation whereby a minor portion of the said precoat cake is exposed to atmosphere while maintaining said reduced pressure on the underside of said entire filter surface, introducing into the tank an insoluble-bearing liquid whereby a layer of insolubles is formed on said precoat cake as it rotates through said liquid, continuing rotation of the filter drum so that successive portions of precoat cake and insolubles deposited thereon are sequentially exposed to the atmosphere, and continuously removing said layer of insolubles and a small portion of said precoat cake from the filter surface just prior to its resubmergence into said insoluble-bearing liquid.

2. Method of claim 1, wherein said minor portion of precoat cake exposed to the atmosphere comprises less than 30 percent of the total filter surface.

3. Method of claim 1, wherein the insoluble-bearing liquid is introduced into the tank and a layer of insolubles is formed on the precoat cake prior to reducing the liquid level.

4. Method of claim 1, wherein the insoluble-bearing liquid is a mixture of particulate solids and hydrocarbons in water.

* * * * *